United States Patent
Yoda

(10) Patent No.: US 9,390,068 B2
(45) Date of Patent: Jul. 12, 2016

(54) SIGNAL PROCESSING CIRCUIT AND ULTRASONIC DIAGNOSTIC APPARATUS

(75) Inventor: Haruo Yoda, Nishitama-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 446 days.

(21) Appl. No.: 13/980,193

(22) PCT Filed: Jan. 13, 2012

(86) PCT No.: PCT/JP2012/051142
§ 371 (c)(1),
(2), (4) Date: Sep. 30, 2013

(87) PCT Pub. No.: WO2012/099228
PCT Pub. Date: Jul. 26, 2012

(65) Prior Publication Data
US 2014/0052765 A1    Feb. 20, 2014

(30) Foreign Application Priority Data
Jan. 18, 2011    (JP) .................................. 2011-007571

(51) Int. Cl.
G06F 17/10    (2006.01)
G06F 17/16    (2006.01)
G01S 7/52    (2006.01)

(52) U.S. Cl.
CPC ............. *G06F 17/16* (2013.01); *G01S 7/52046* (2013.01)

(58) Field of Classification Search
CPC ............................ G06F 17/16; G01S 7/52046
USPC ........................................................ 708/400
See application file for complete search history.

(56) References Cited

U.S. PATENT DOCUMENTS 5,684,435 A    11/1997    Bergen
6,482,160 B1   11/2002    Stergiopoulos et al.
(Continued)

FOREIGN PATENT DOCUMENTS

CN    101185273 A    5/2008
CN    101917164 A    12/2010
(Continued)

OTHER PUBLICATIONS

Chinese Office Action dated Jul. 11, 2014 issued in corresponding Chinese Patent Application 201280005656.1.
Karkooti, M., et al., FPGA Implementation of Matrix Inversion Using QRD-RLS Algorithm, IEEE, pp. 1625-1629, 2005 (1-4244-0132-1/05).
(Continued)

*Primary Examiner* — Tan V. Mai
(74) *Attorney, Agent, or Firm* — Fitzpatrick, Cella, Harper & Scinto

(57) ABSTRACT

A signal processing circuit respectively transforms complex covariance matrices, which are consecutively inputted at a predetermined period, into upper triangular matrices. The signal processing circuit includes: a storage unit that stores at least N-number of complex covariance matrices; a reading unit that reads matrix elements of the stored complex covariance matrices; a CORDIC calculation circuit that implements a CORDIC algorithm by a pipelined circuit system; and a QR decomposition unit that controls the reading unit and the CORDIC calculation circuit unit to calculate an upper triangular matrix by iteratively using the CORDIC calculation circuit unit on a single complex covariance matrix and that calculates in parallel a transformation of N-number of complex covariance matrices into upper triangular matrices in an interleaved format.

9 Claims, 6 Drawing Sheets

(56) References Cited

U.S. PATENT DOCUMENTS

| | | | |
|---|---|---|---|
| 6,675,187 | B1 | 1/2004 | Greenberger |
| 7,736,314 | B2 | 6/2010 | Beach et al. |
| 7,830,988 | B2 | 11/2010 | Maru |
| 2003/0065262 | A1 | 4/2003 | Stergiopoulos et al. |
| 2009/0110120 | A1 | 4/2009 | McNamara et al. |
| 2014/0233682 | A1* | 8/2014 | Hasegawa ........... H04L 27/2647 375/340 |

FOREIGN PATENT DOCUMENTS

| | | |
|---|---|---|
| EP | 1772809 A2 | 4/2007 |
| JP | 10-107547 A | 4/1998 |
| JP | 2001-56808 A | 2/2001 |
| JP | 2001-187055 A | 7/2001 |
| JP | 2006-324710 A | 11/2006 |
| JP | 2008-511415 A | 4/2008 |
| JP | 2009-135906 A | 6/2009 |
| WO | 2011129061 A1 | 10/2011 |

OTHER PUBLICATIONS

Seki, K., et al., A Cordic-Based Reconfigrable Systolic Array Processor for MIMO-OFDM Wireless Communications, IEEE, pp. 639-644, 2007 (1-4244-1222-6/07).

Walke, R. L., et al., Architectures for Adaptive Weight Calculation on ASIC and FPGA, IEEE, pp. 1375-1380, 1999 (0-7803-5700-0/99).

Lightbody, G., et al., Novel Mapping of a Linear QR Architecture, IEEE, pp. 1933-1936, 1999 (0-7803-5041-3/99).

Dick, C., et al., Implementing a Real-Time Beamformer on an FPGA Platform, Xcell Journal, 2nd Quarter 2007, pp. 36-40, 2007 (XP-002538192).

Hu, Y. H., Cordic-Based VLSI Architectures for Digital Signal Processing, IEEE Signal Processing Magazine, pp. 16-35, Jul. 1992 (1053-5888/92).

International Search Report dated Apr. 20, 2012 issued in corresponding PCT Patent Application No. PCT/JP2012/051142.

* cited by examiner

ROT PROCESS

VEC PROCESS

CORDIC CIRCUIT INPUT/OUTPUT
IN CASE OF SINGLE MATRIX

CORDIC CIRCUIT INPUT
IN CASE OF PARALLEL PROCESSING OF
THREE MATRICES

FIG. 6

|  | T1 | T2 | T3 | T4 | T5 | T6 | T7 | T8 | T9 | T10 | T11 | T12 | T13 | T14 |
|---|---|---|---|---|---|---|---|---|---|---|---|---|---|---|
| 11a1 | A1P1 | A1P2 | A1P3 | A4P1 | A4P2 | A4P3 | A7P1 | A7P2 | A7P3 | A10P1 | A10P2 | A10P3 | - | - |
| 11a2 | - | A2P1 | A2P2 | A2P3 | A5P1 | A5P2 | A5P3 | A8P1 | A8P2 | A8P3 | A11P1 | A11P2 | A11P3 | - |
| 11a3 | - | - | A3P1 | A3P2 | A3P3 | A6P1 | A6P2 | A6P3 | A9P1 | A9P2 | A9P3 | A12P1 | A12P2 | A12P3 |

SIGNAL PROCESSING CIRCUIT AND ULTRASONIC DIAGNOSTIC APPARATUS

TECHNICAL FIELD

The present invention relates to a calculation circuit that executes QR decomposition of a complex covariance matrix, and more particularly, to a calculation circuit system suitably applied to an adaptive signal processing circuit of an ultrasonic diagnostic apparatus.

BACKGROUND ART

In recent years, due to progress made in digital signal processing technology, advanced adaptive signal processing is being implemented in more and more fields such as radar signal processing, wireless communication, and wireless LANs. The introduction of adaptive signal processing to ultrasonic echo signal processing is also being reviewed in the field of ultrasonic diagnostic apparatuses and is expected to enhance resolution and contrast of echo images.

Adaptive signal processing is an advanced signal processing technique that involves reconfiguring and optimizing signal processing while learning characteristics of an input signal. Many methods have already been proposed such as a Minimum Mean Square Error (MMSE) method, a Maximum Signal-to-Noise (MSN) Ratio method, and a Constrained Minimization of Power (CMP) method. However, adaptive signal processing requires an enormous amount of calculations compared to ordinary signal processing. As such, realizing a small-sized and low-priced calculation unit capable of executing such an enormous amount of calculations at high speed has become a major issue towards practical application of adaptive signal processing.

Adaptive signal processing when using the CMP method in an ultrasonic diagnostic apparatus will now be described. In the CMP method, an input signal is optimized by retaining a signal component protected by a constraint as is and suppressing other interference wave components by minimizing output power. In doing so, using a complex covariance matrix A of sequentially-inputted ultrasonic received signals and a constraint vector C, $$C^H A^{-1} C \quad (1)$$

is calculated. For the calculation term (1), normally, a calculation term (2)

$$A^{-1} C \quad (2)$$

is calculated, and an inner product of a result thereof and the constraint vector C is calculated. The calculation term (2) includes an inverse matrix and is a major factor in the enormous amount of calculations required by adaptive signal processing. In the CMP method, a constrained minimized power value p is calculated as $$p = \text{Log}\left[\frac{1}{2 \cdot C^H A^{-1} C}\right] \quad (3)$$

and is assumed to be one pixel signal of an echo image.

Preventing degradation of pixel density of an ultrasonic echo image requires that the complex covariance matrix is created at a period of at least approximately 5 MHz and, accordingly, the constrained minimized power value p must also be calculated at a period of 5 MHz or more.

As described above, applying the CMP method to an ultrasonic diagnostic apparatus requires a small-sized and low-priced calculation unit capable of calculating the calculation term (2), which demands a large amount of calculations by its nature, at a period of 5 MHz or more or, in other words, in a short period of time equal to or less than 200 ns. This presents a major issue in practical application.

In a similar manner to the CMP method, in an optimization calculation process of many adaptive signal processing techniques such as the MMSE method and the MSN method, a calculation term (4)

$$A^{-1} y \quad (4)$$

that is a product of an inverse matrix of the complex covariance matrix A and a complex vector y appears. In principle, a calculation of an inverse matrix requires a large number of calculations which is proportional to the cube of a size of the matrix, and when a complex number is involved, the number of calculations further increases.

In order to clarify the background of the present invention, a calculation method of the calculation term (4) will be described in concrete terms. The calculation term (4) can be calculated as a solution vector x of a simultaneous linear equation (5) having the complex covariance matrix A as a coefficient.

$$Ax = y \quad (5)$$

While the simultaneous linear equation can be solved in many ways, a general solution uses a combination of a QR decomposition process and a backward substitution process.

The matrix form of the calculation term (5) can be expressed by expanding into elements as $$\begin{bmatrix} a_{11} & a_{12} & a_{13} & \cdots & a_{1n} \\ a_{21} & a_{22} & a_{23} & \cdots & a_{2n} \\ a_{31} & a_{32} & a_{33} & \cdots & a_{3n} \\ \vdots & \vdots & \vdots & \ddots & \vdots \\ a_{n1} & a_{n2} & a_{n3} & \cdots & a_{nn} \end{bmatrix} \begin{bmatrix} x_1 \\ x_2 \\ x_3 \\ \vdots \\ x_n \end{bmatrix} = \begin{bmatrix} y_1 \\ y_2 \\ y_3 \\ \vdots \\ y_n \end{bmatrix}. \quad (6)$$

A QR decomposition process refers to a calculation process in which both sides of the Expression (6) is multiplied by an appropriate matrix to transform a coefficient matrix into an upper triangular matrix as expressed by $$\begin{bmatrix} r_{11} & r_{12} & r_{13} & \cdots & r_{1n} \\ 0 & r_{22} & r_{23} & \cdots & r_{2n} \\ 0 & 0 & r_{33} & \cdots & r_{3n} \\ \vdots & \vdots & \vdots & \ddots & \vdots \\ 0 & 0 & 0 & \cdots & r_{nn} \end{bmatrix} \begin{bmatrix} x_1 \\ x_2 \\ x_3 \\ \vdots \\ x_n \end{bmatrix} = \begin{bmatrix} b_1 \\ b_2 \\ b_3 \\ \vdots \\ b_n \end{bmatrix}. \quad (7)$$

In addition, a backward substitution process refers to a process of calculating respective elements $x_1, x_2, \ldots, x_n$ of the solution vector x according to a procedure expressed as follows from the simultaneous linear equation transformed into the form of Expression (7).

$$x_n = \frac{1}{r_{nn}} \cdot b_n \quad (8)$$

$$x_{n-1} = \frac{1}{r_{n-1\,n-1}} \cdot (b_{n-1} - r_{n-1\,n} \cdot x_n)$$

-continued $$x_{n-2} = \frac{1}{r_{n-2\,n-2}} \cdot (b_{n-2} - r_{n-2\,n} \cdot x_n - r_{n-2\,n-1} \cdot x_{n-1})$$

$$x_{n-3} = \frac{1}{r_{n-3\,n-3}} \cdot (b_{n-3} - r_{n-3\,n} \cdot x_n - r_{n-3\,n-1} \cdot x_{n-1} - r_{n-3\,n-2} \cdot x_{n-2})$$

⋮

The calculation procedure is referred to as a backward substitution process because substitution is iteratively executed in sequence from a final element of the solution vector x. A comparison between amounts of calculation required by a QR decomposition process and a backward substitution process reveals that the calculations of a QR decomposition process overwhelmingly outnumber the calculations of a backward substitution process. Therefore, the issue regarding a calculation amount described earlier can be considered an issue of the enormousness of the calculation amount of a QR decomposition process.

As described above, a general method of solving the calculation term (4) that appears in adaptive signal processing combines a QR decomposition process with a backward substitution process. For example, Patent Literature 1 discloses a combination of a QR decomposition process and a backward substitution process using a Givens Rotation method. In addition, Patent Literature 2 discloses a QR decomposition process according to a Givens Rotation method and a QR decomposition circuit having a systolic array structure.

A QR decomposition circuit with a systolic array structure has a large circuit size if realized without modification. In consideration thereof, Non-Patent Literature 1 proposes reducing circuit size by iteratively using circuits comprising two types of basic cells that constitute a systolic array. Non-Patent Literature 1 also provides a report on creating an inversion matrix calculation circuit of a 4×4 matrix on an FPGA that is a simple LSI to achieve a calculating speed of approximately 8.1 μs.

However, as described above, applying adaptive signal processing to an ultrasonic diagnostic apparatus requires that a QR decomposition process and a backward substitution process be executed at a period of 5 MHz or more, which means that a calculating speed that is dozens of times higher than the calculating speed provided by the circuits described in NPL1 is required.

(PTL1) Japanese Patent Application Laid-open No. 2006-324710
(PTL2) Japanese Patent Application Laid-open No. 2009-135906

Non Patent Literature (NPL1) M. Karkooti, et. al. "FPGA Implementation of Matrix Inversion Using QRD-RLS Algorithm", Asilomar Conference on Signal, System, and Computers, October 2005

DISCLOSURE OF INVENTION

In consideration of the problems described above, it is an object of the present invention to provide a signal processing circuit capable of calculating QR decomposition, which requires a particularly large amount of calculations, at high speed, and to realize a high-performance ultrasonic diagnostic apparatus using adaptive signal processing.

In order to solve the problems, the present invention in one aspect presents a signal processing circuit that respectively transforms complex covariance matrices, which are consecutively inputted at a predetermined period, into upper triangular matrices, the signal processing circuit comprising:
a storage unit that stores at least N-number of complex covariance matrices;
a reading unit that reads matrix elements of the stored complex covariance matrices;
a CORDIC calculation circuit that implements a CORDIC algorithm by a pipelined circuit system; and
a QR decomposition unit that controls the reading unit and the CORDIC calculation circuit to calculate an upper triangular matrix by iteratively using the CORDIC calculation circuit on a single complex covariance matrix and that calculates in parallel a transformation of N-number of complex covariance matrices into upper triangular matrices in an interleaved format.

The present invention in another aspect presents an ultrasonic diagnostic apparatus comprising:
a plurality of ultrasonic receiving elements that receive ultrasonic waves emitted from a subject and convert the ultrasonic waves into received signals;
a time-delay circuit that uniformizes phases of a plurality of received signals acquired from the plurality of ultrasonic receiving elements; and
an adaptive signal processing unit that applies adaptive signal processing to phase-uniformized received signals acquired from the time-delay circuit, wherein
the adaptive signal processing unit comprises:
a complexification circuit that respectively complexifies the phase-uniformized received signals and acquires a plurality of complex signals;
a covariance matrix calculation circuit that calculates complex covariance matrices of the plurality of complex signals; and
the above-mentioned signal processing circuit which transforms the complex covariance matrices into upper triangular matrices.

According to the present invention, a small-sized and low-priced signal processing circuit capable of calculating QR decomposition at high speed can be provided. Also, an high-performance ultra sonic diagnostic apparatus using adaptive signal processing can be provided.

Further features of the present invention will become apparent from the following description of exemplary embodiments with reference to the attached drawings.

BRIEF DESCRIPTION OF DRAWINGS

FIG. 6 is an explanatory diagram of a parallel calculation operating sequence according to the present embodiment.

DESCRIPTION OF EMBODIMENTS

Figure 1:
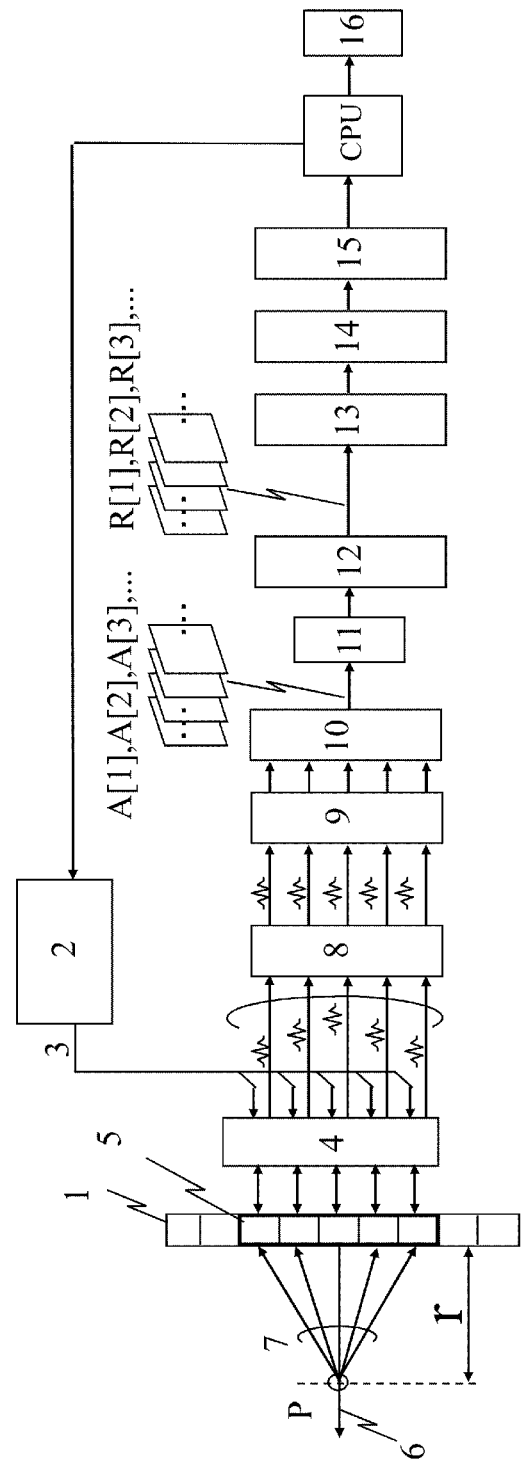
FIG. 1 is a diagram showing a configuration of an ultrasonic diagnostic apparatus according to a present embodiment.

Adaptive signal processing can be applied as a technique for enhancing performance also in the field of ultrasonic diagnostic apparatuses. An object of applying adaptive signal processing is to eliminate the influence of noise waves from an echo signal received by a plurality of receiving elements and to receive at a satisfactory SN ratio only a reflected wave signal from a focus point in order to enhance resolution and contrast of an echo image. However, since a direction and an intensity of a noise wave superimposed on an ultrasonic echo signal change rapidly within an extremely short period of time due to a distribution of reflective material inside a subject, calculations unique to adaptive signal processing must be iterated at extremely short periods of several ten ns to several hundred ns in order to prevent degradation of resolution in a time direction. In addition, a size of a complex covariance matrix A is desirably around at least 6×6 to 10×10, and applying adaptive signal processing to an ultrasonic diagnostic apparatus has a problem in that a calculating speed which is substantially dozens to hundreds of times greater than the calculating speed provided in NPL1 described earlier is required. In this case, in order to increase calculating speed, it is essential to perform QR decomposition which accounts for a major portion of adaptive signal processing at high speed.

While various methods for QR decomposition are known, a Givens Rotation method is used in the present invention. The Givens Rotation method is a method of transforming a covariance matrix A into an upper triangulation matrix by sequentially transforming matrix elements of a lower triangular region of the covariance matrix one by one into a "0" element while iterating two-dimensional vector rotation. In addition, a well known CORDIC (COordinate Rotation DIgital Computer) algorithm is used as a two-dimensional vector rotation algorithm that is a basic calculation of the Givens Rotation method.

The CORDIC algorithm is an algorithm having a basic principle of causing a two-dimensional vector to converge at a desired rotation angle by rotating the two-dimensional vector left or right according to a predetermined row of rotation angles. The CORDIC algorithm has a superior characteristic in that a rotation can be achieved by a process that only involves integer-type addition and subtraction without having to perform complicated calculations of trigonometric functions and square roots. On the other hand, in principle, the CORDIC algorithm requires sequential calculations to be performed and therefore has a disadvantage of requiring along period of time until a result is outputted.

A QR decomposition process can be easily realized by a calculation circuit that combines the Givens Rotation method and the CORDIC algorithm. However, since a procedure of transforming matrix elements one by one into "0" elements by the Givens Rotation method includes many calculation processes in which a result of one calculation is used for a next calculation, conventionally, it has been difficult to use the CORDIC algorithm which takes a long time to produce a result of one calculation for high-speed calculations.

In consideration thereof, NPL1 achieves a higher calculation speed by replacing the Givens Rotation method with an SGR (Squared Givens Rotation) method that can be executed by the four arithmetic operations alone and directly performing calculations using a floating-point calculation circuit. Such an arrangement is capable of significantly increasing speed of QR decomposition per covariance matrix. However, since a floating-point calculation circuit is complicated and has a large circuit size, achieving a significant increase in speed and a reduction in size suitable for ultrasonic applications has been difficult.

In order to realize a high-speed circuit while utilizing the characteristic of the CORDIC algorithm which can be realized by a simple calculation circuit, the present invention:

(1) implements sequential processing of the CORDIC algorithm with a pipelined circuit, and (2) calculates, in parallel in an interleaved format, QR decomposition of a plurality of consecutively inputted complex covariance matrix.

In this case, parallel calculation in an interleaved format is a data processing format generally used when calculating a complicated complex calculation consisting of a plurality of calculation steps a plurality of times using a single processor by time-sharing the processor so that the respective calculation steps of the complicated complex calculation are interleaved among each other.

While a pipelined circuit increases the time required until a result is obtained, since different rotations can be consecutively inputted and executed from clock to clock, the time required for each rotation can be reduced up to one clock. Therefore, by prioritizing rotation that can be calculated among the calculations for a plurality of complex covariance matrices and executing the rotations so that the rotations are interleaved among each other in an interleaved format, an amount of calculation per unit time can be significantly reduced. As a result, while a long period of time is required until a calculation result is outputted, a calculation period per inputted matrix can be significantly reduced.

<Overall Configuration of Ultrasonic Diagnostic Apparatus>

FIG. 1 is a block diagram of an ultrasonic diagnostic apparatus using the CMP method according to an embodiment of the present invention.

An ultrasonic probe 1 is used so as to come into contact with a subject, and sends and receives an ultrasonic beam to/from the subject. The ultrasonic probe 1 comprises a plurality of ultrasonic transmitting/receiving elements (transducers) 5 which transmits an ultrasonic beam based on an applied drive signal, receives a propagating ultrasonic echo emitted (reflected) by the subject, converts the ultrasonic echo into a received signal that is an analog signal, and outputs the received signal. The ultrasonic transmitting/receiving elements are one-dimensionally or two-dimensionally arranged to forma transducer array (element array). Alternatively, the ultrasonic probe 1 may comprise ultrasonic transmitting elements and ultrasonic receiving elements instead of transducers.

A transmission signal processing circuit 2 generates a transmission signal 3 under an instruction of a CPU and drives an ultrasonic transmitting/receiving element group 5 via a switching circuit 4. Accordingly, a pulsed ultrasonic beam 6 is transmitted from the ultrasonic probe 1. An ultrasonic echo wave 7 generated by a reflection of the ultrasonic beam 6 is converted into an electric signal by the ultrasonic transmitting/receiving element group 5 and sent to a time-delay circuit 8 via the switching circuit 4.

The time-delay circuit 8 is a circuit that performs reception focusing or, in other words, adjusts a time delay of each received signal so that arrival times of echo signals from a same point P become uniform. More specifically, received ultrasonic signals from a plurality of channels are subjected to a desired focus delay and then added. While a configuration up to the time-delay circuit 8 is common with an ordinary ultrasonic diagnostic apparatus that does not perform adaptive signal processing, processes subsequent to the time-delay circuit 8 are unique to adaptive signal processing (CMP method).

A signal complexification circuit 9 is a circuit which respectively adds a signal 90 degrees out of phase as an imaginary signal to each received signal to obtain a plurality of complex signals. A complex covariance matrix calculation circuit 10 is a circuit which generates a complex covariance matrix A among received signals converted into complex signals at a predetermined period and stores the complex covariance matrix A in a storage circuit 11.

For example, when a transmission signal 3 from the transmission signal processing circuit 2 is transmitted via the ultrasonic transmitting/receiving element group 5, echo signals of the transmission signal 3 are consecutively received during approximately 100 µs after the transmission, and digital signals sampled at a 50 MHz clock is transferred to the time-delay circuit 8. Signals whose delay time is adjusted by the time-delay circuit are transformed into a complex covariance matrix every 10 clocks (5 MHz) by the signal complexification circuit 9 and the complex covariance matrix calculation circuit 10, and a series of transformed covariance matrices A[1], A[2], A[3], . . . are temporarily stored in the storage circuit 11.

Although the complex covariance matrix calculation circuit 10 actually generates an output matrix by applying additional processes such as time averaging and space averaging on an input signal covariance matrix, details thereof are not directly relevant to the present invention and therefore will be omitted.

A QR decomposition circuit 12, a backward substitution circuit 13, and an inner product calculation circuit 14 are processing circuits characteristic of adaptive signal processing, and calculate a calculation term (1)

$$C^H A^{-1} C \quad (1)$$

that uses a known constraint vector C for each of the covariance matrices A[i] consecutively stored in the storage circuit 11. In this case, the constraint vector C is a directional vector that specifies a desired receiving direction of an ultrasonic signal, and is normally a column vector having 1 as all of its elements with respect to an input signal subjected to a time-delay process. In addition, a symbol H on a right shoulder signifies a complex conjugate transpose matrix.

Normally, calculating the calculation term (1) involves calculating a calculation term (2)

$$A^{-1} C \quad (2)$$

and performing an inner product calculation of a result thereof and the constraint vector C. The calculation term (2) includes an inverse matrix and is therefore a major factor in the enormous amount of calculations of adaptive signal processing. Accordingly, it is a primary object of the present embodiment to realize a calculation unit that is capable of executing this calculation at high speed.

A LOG transformation circuit 15 uses the calculation result to calculate a constrained minimized power value p according to the CMP method as $$p = \text{Log}\left[\frac{1}{2 \cdot C^H A^{-1} C}\right], \quad (3)$$

and transfers the constrained minimized power value p to the CPU as one pixel signal of an echo image. In other words, since the complex covariance matrix A is generated every 10 clocks as described earlier, one pixel value is also calculated every 10 clocks. The CPU edits the transferred echo image signal and displays the same as an echo image on a display device 16.

According to the configuration shown in FIG. 1, a high-performance ultrasonic diagnostic apparatus using adaptive signal processing can be realized. However, performing real-time image display with an apparatus configured in this manner requires the three circuits described earlier, namely, the QR decomposition circuit 12, the backward substitution circuit 13, and the inner product calculation circuit 14 respectively complete calculations within the iteration period of covariance matrices generated one after another. Among the three circuits, the calculation amount of the QR decomposition circuit 12 is particularly large. In the example described earlier, the iteration period of the covariance matrices is 200 ns, which corresponds to a period of time equivalent to 10 clocks of the 50 MHz clock. This means that high-speed calculation of dozens of times faster than the 8.1 µs disclosed in NPL1 is required.

The present embodiment enables calculations dozens to hundreds of times faster than conventional examples by ingeniously designing the QR decomposition circuit 12 that performs a QR decomposition process which has a particularly large calculation volume among adaptive signal processing. In addition, the present embodiment also enables the QR decomposition circuit 12 to be created in a small size and at a low cost. Due to such a small-size and low-cost high-performance QR decomposition circuit 12, a high-performance ultrasonic diagnostic apparatus to which adaptive signal processing is applied can be realized.

Moreover, while a configuration adopting the CMP method has been described as adaptive signal processing in the example above, even when adopting other methods such as the MMSE method and the MSN method, the fact remains that high-speed calculations are required. In addition, with any method, QR decomposition is a portion that requires a particularly large amount of calculation. Therefore, a high-performance ultrasonic diagnostic apparatus to which adaptive signal processing such as the MMSE method and the MSE method is applied can be realized using the QR decomposition circuit 12 according to the present embodiment.

<Givens Rotation Algorithm>

In order to provide a specific description of contents of the QR decomposition circuit 12 according to the present embodiment, hereinafter, a QR decomposition process using the Givens rotation algorithm will be described in greater detail. As described earlier, the Givens Rotation method is a calculation method in which two-dimensional vector rotation is iterated to transform matrix elements one by one into "0" elements.

In other words, first, as presented in Expression (9), a covariance matrix A is premultiplied by a rotation matrix Q to change a 2nd row, 1st column element of the covariance matrix A to "0". At this point, the multiplication by the rotation matrix Q in Expression (9) is equivalent to executing a rotation of n-number of two-dimensional vectors constituted by two elements arranged in vertical directions of the 1st and 2nd rows of the covariance matrix A.

$$\begin{bmatrix} q_{11}^{[12]} & q_{12}^{[12]} & 0 & \cdots & 0 \\ q_{21}^{[12]} & q_{22}^{[12]} & 0 & \cdots & 0 \\ 0 & 0 & 1 & \cdots & 0 \\ \vdots & \vdots & \vdots & \ddots & \vdots \\ 0 & 0 & 0 & \cdots & 1 \end{bmatrix} \quad (9)$$

$$\begin{bmatrix} a_{11}^{[1]} & a_{12}^{[1]} & a_{13}^{[1]} & \cdots & a_{1n}^{[1]} \\ a_{21}^{[1]} & a_{22}^{[1]} & a_{23}^{[1]} & \cdots & a_{2n}^{[1]} \\ a_{31}^{[1]} & a_{32}^{[1]} & a_{33}^{[1]} & \cdots & a_{3n}^{[1]} \\ \vdots & \vdots & \vdots & \ddots & \vdots \\ a_{n1}^{[1]} & a_{n2}^{[1]} & a_{n3}^{[1]} & \cdots & a_{nn}^{[1]} \end{bmatrix} \Rightarrow \begin{bmatrix} a_{11}^{[2]} & a_{12}^{[2]} & a_{13}^{[2]} & \cdots & a_{1n}^{[2]} \\ 0 & a_{22}^{[2]} & a_{23}^{[2]} & \cdots & a_{2n}^{[2]} \\ a_{31}^{[1]} & a_{32}^{[1]} & a_{33}^{[1]} & \cdots & a_{3n}^{[1]} \\ \vdots & \vdots & \vdots & \ddots & \vdots \\ a_{n1}^{[1]} & a_{n2}^{[1]} & a_{n3}^{[1]} & \cdots & a_{nn}^{[1]} \end{bmatrix}$$

Next, another rotation matrix Q is premultiplied as presented in Expression (10) to change a 3rd row, 1st column element to "0". The multiplication by the rotation matrix Q in Expression (10) is equivalent to executing a rotation of n-number of two-dimensional vectors constituted by two elements arranged in vertical directions of the 1st and 3rd rows of the covariance matrix A.

$$\begin{bmatrix} q_{11}^{[13]} & 0 & q_{12}^{[13]} & \cdots & 0 \\ 0 & 1 & 0 & \cdots & 0 \\ q_{21}^{[13]} & 0 & q_{22}^{[13]} & \cdots & 0 \\ \vdots & \vdots & \vdots & \ddots & \vdots \\ 0 & 0 & 0 & \cdots & 1 \end{bmatrix} \quad (10)$$

$$\begin{bmatrix} a_{11}^{[2]} & a_{12}^{[2]} & a_{13}^{[2]} & \cdots & a_{1n}^{[2]} \\ 0 & a_{22}^{[2]} & a_{23}^{[2]} & \cdots & a_{2n}^{[2]} \\ a_{31}^{[1]} & a_{32}^{[1]} & a_{33}^{[1]} & \cdots & a_{3n}^{[1]} \\ \vdots & \vdots & \vdots & \ddots & \vdots \\ a_{n1}^{[1]} & a_{n2}^{[1]} & a_{n3}^{[1]} & \cdots & a_{nn}^{[1]} \end{bmatrix} \Rightarrow \begin{bmatrix} a_{11}^{[3]} & a_{12}^{[3]} & a_{13}^{[3]} & \cdots & a_{1n}^{[3]} \\ 0 & a_{22}^{[2]} & a_{23}^{[2]} & \cdots & a_{2n}^{[2]} \\ 0 & a_{32}^{[2]} & a_{33}^{[2]} & \cdots & a_{3n}^{[2]} \\ \vdots & \vdots & \vdots & \ddots & \vdots \\ a_{n1}^{[1]} & a_{n2}^{[1]} & a_{n3}^{[1]} & \cdots & a_{nn}^{[1]} \end{bmatrix}$$

By iterating a similar process to an n-th row, 1st column element, conversion of 1st column elements into an upper triangular matrix is completed as presented in Expression (11).

$$\begin{bmatrix} q_{11}^{[1n]} & 0 & 0 & \cdots & q_{12}^{[1n]} \\ 0 & 1 & 0 & \cdots & 0 \\ 0 & 0 & 1 & \cdots & 0 \\ \vdots & \vdots & \vdots & \ddots & \vdots \\ q_{21}^{[1n]} & 0 & 0 & \cdots & q_{22}^{[1n]} \end{bmatrix} \quad (11)$$

$$\begin{bmatrix} a_{11}^{[n-1]} & a_{12}^{[n-1]} & a_{13}^{[n-1]} & \cdots & a_{1n}^{[n-1]} \\ 0 & a_{22}^{[2]} & a_{23}^{[2]} & \cdots & a_{2n}^{[2]} \\ 0 & a_{32}^{[2]} & a_{33}^{[2]} & \cdots & a_{3n}^{[2]} \\ \vdots & \vdots & \vdots & \ddots & \vdots \\ a_{n1}^{[1]} & a_{n2}^{[1]} & a_{n3}^{[1]} & \cdots & a_{nn}^{[1]} \end{bmatrix} \Rightarrow \begin{bmatrix} a_{11}^{[n]} & a_{12}^{[n]} & a_{13}^{[n]} & \cdots & a_{1n}^{[n]} \\ 0 & a_{22}^{[2]} & a_{23}^{[2]} & \cdots & a_{2n}^{[2]} \\ 0 & a_{32}^{[2]} & a_{33}^{[2]} & \cdots & a_{3n}^{[2]} \\ \vdots & \vdots & \vdots & \ddots & \vdots \\ 0 & a_{n2}^{[2]} & a_{n3}^{[2]} & \cdots & a_{nn}^{[2]} \end{bmatrix}$$

Once the conversion of 1st column elements into an upper triangular matrix is completed, the rotation matrix Q is multiplied as presented in Expression (12) to change a 2nd row, 2nd column element to "0".

$$\begin{bmatrix} 1 & 0 & 0 & \cdots & 0 \\ 0 & q_{11}^{[23]} & q_{22}^{[23]} & \cdots & 0 \\ 0 & q_{21}^{[23]} & q_{22}^{[23]} & \cdots & 0 \\ \vdots & \vdots & \vdots & \ddots & \vdots \\ 0 & 0 & 0 & \cdots & 1 \end{bmatrix} \quad (12)$$

$$\begin{bmatrix} a_{11}^{[n]} & a_{12}^{[n]} & a_{13}^{[n]} & \cdots & a_{1n}^{[n]} \\ 0 & a_{22}^{[2]} & a_{23}^{[2]} & \cdots & a_{2n}^{[2]} \\ 0 & a_{32}^{[2]} & a_{33}^{[2]} & \cdots & a_{3n}^{[2]} \\ \vdots & \vdots & \vdots & \ddots & \vdots \\ 0 & a_{n2}^{[2]} & a_{n3}^{[2]} & \cdots & a_{nn}^{[2]} \end{bmatrix} \Rightarrow \begin{bmatrix} a_{11}^{[n]} & a_{12}^{[n]} & a_{13}^{[n]} & \cdots & a_{1n}^{[n]} \\ 0 & a_{22}^{[3]} & a_{23}^{[3]} & \cdots & a_{2n}^{[3]} \\ 0 & 0 & a_{33}^{[3]} & \cdots & a_{3n}^{[3]} \\ \vdots & \vdots & \vdots & \ddots & \vdots \\ 0 & a_{n2}^{[2]} & a_{n3}^{[2]} & \cdots & a_{nn}^{[2]} \end{bmatrix}$$

By iterating such processes one after another, once upper triangulation of 2nd column elements is completed, 3rd column and 4th column elements are sequentially upper-triangulated and, eventually, the upper triangulation of the inputted matrix is completed.

As shown above, while QR decomposition using a Givens Rotation iterates matrix calculations the same number of times as the elements to be changed into "0", all of the matrix calculations is based on rotating a two-dimensional vector. Therefore, taking an upper triangulation calculation of a 2×2 matrix presented in Expression (13) as an example, a Givens Rotation calculation procedure will be described in greater detail.

$$\begin{bmatrix} q_{11} & q_{12} \\ q_{21} & q_{22} \end{bmatrix} \begin{bmatrix} a_{11} & a_{12} \\ a_{21} & a_{22} \end{bmatrix} \Rightarrow \begin{bmatrix} b_{11} & b_{12} \\ 0 & b_{22} \end{bmatrix} \quad (13)$$

In the case of a 2×2 matrix, a Givens Rotation process involves first obtaining respective coefficients of a rotation matrix Q that changes a 2nd row, 1st column element of the covariance matrix A into "0" and then performing a matrix multiplication using the rotation matrix Q.

If the covariance matrix is a real matrix, by calculating an absolute value and an argument of a vector constituted by 1st column elements as presented in Expression (14), $$R_{a1} = \sqrt{(a_{11})^2 + (a_{21})^2} \quad (14)$$
$$\theta = \mathrm{ArcTan}\left[\frac{a_{21}}{a_{11}}\right]$$

then the rotation matrix Q can be obtained as Expression (15).

$$\begin{bmatrix} q_{11} & q_{12} \\ q_{21} & q_{22} \end{bmatrix} = \begin{bmatrix} \cos\theta & \sin\theta \\ -\sin\theta & \cos\theta \end{bmatrix} \quad (15)$$

In addition, if expressing a result of rotation of a vector constituted by 2nd column elements of the covariance matrix A as Expression (16), $$\begin{bmatrix} \cos\theta & \sin\theta \\ -\sin\theta & \cos\theta \end{bmatrix} \begin{bmatrix} a_{12} \\ a_{22} \end{bmatrix} = \begin{bmatrix} b_{12} \\ b_{22} \end{bmatrix} \quad (16)$$

then a result of a multiplication of the covariance matrix A and the rotation matrix Q can be expressed by Expression (17).

$$\begin{bmatrix} \cos\theta & \sin\theta \\ -\sin\theta & \cos\theta \end{bmatrix} \begin{bmatrix} a_{11} & a_{12} \\ a_{21} & a_{22} \end{bmatrix} = \begin{bmatrix} R_{a1} & b_{12} \\ 0 & b_{22} \end{bmatrix} \quad (17)$$

Herein, the process of Expression (14) that obtains an absolute value and an argument of a two-dimensional vector will be referred to as a VEC (VECtoring) process and the rotation of Expression (16) as an ROT (ROTation) process. A QR decomposition using the Givens Rotation method of an arbitrary n×n real matrix presented in Expressions (9) to (12) can be executed by iterating the VEC process and the ROT process a large number of times.

When the covariance matrix A is a complex number, since rotation in a complex plane is required, the calculation procedure for the Givens Rotation method becomes somewhat complicated. However, a rotation of a complex number in a complex plane and a calculation of an absolute value and an argument of a complex number can be calculated in exactly the same manner as calculating a two-dimensional vector. Therefore, while details will be omitted, even if the covariance matrix is composed of complex numbers, it is known that the Givens Rotation method can be executed by iterating the VEC process and the ROT process a large number of times.

With adaptive signal processing, normally, a covariance matrix composed of complex numbers is used. However, since adaptive signal processing of a complex matrix can be executed in the same manner as in a case of a real matrix by iterating the VEC process and the ROT process, a case of a real matrix will now be assumed and described for the sake of simplicity.

<CORDIC Algorithm>

As is well known, the easiest method of calculating the VEC process and the ROT process in the Givens Rotation method involves using a circuit to which a CORDIC algorithm is applied. As such, an outline of a CORDIC algorithm will now be described. The CORDIC algorithm is a method of performing a desired rotation by transforming a rotation matrix as expressed by $$\begin{bmatrix} \cos\theta & \sin\theta \\ -\sin\theta & \cos\theta \end{bmatrix} \Rightarrow \cos\theta \cdot \begin{bmatrix} 1 & \tan\theta \\ -\tan\theta & 1 \end{bmatrix} \quad (18)$$

and combining a rotation of an angle $\theta_j$ that satisfies $$\tan\theta_j = 2^{-j} \, j=1,2,\ldots \quad (19).$$

In other words, if a total rotation angle is smaller than a desired rotation angle, rotation is applied by an angle $\theta_j$ in a positive direction, and if the total rotation angle is greater than a desired rotation angle, rotation is applied by an angle $\theta_j$ in a negative direction.

Figure 2A:
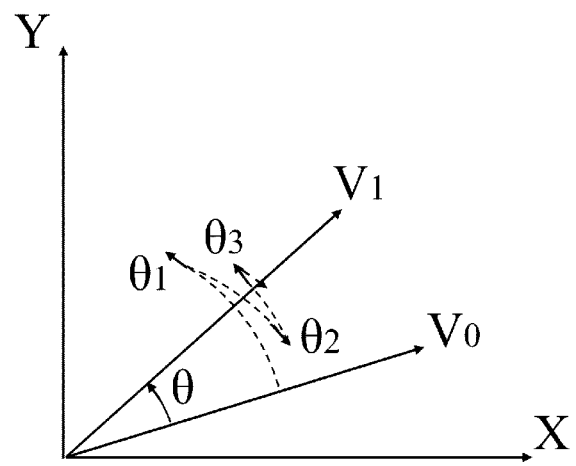
FIG. 2A is an explanatory diagram of an ROT process using a CORDIC algorithm.

FIG. 2A specifically shows a procedure of an ROT process in which a two-dimensional vector V0 is rotated by an angle $\theta$ to a vector V1. First, since the angle $\theta$ is positive, the vector V0 is rotated by an angle $\theta_1$ in the positive direction. Next, since the rotation angle $\theta_1$ is greater than $\theta$, the rotation result is rotated by an angle $\theta_2$ in the negative direction. Furthermore, since a total rotation angle $\theta_1 - \theta_2$ is smaller than the angle $\theta$, the rotation result is rotated by an angle $\theta_3$ in the positive direction. By executing rotations of the vector V0 according to a series of angles denoted as j=1, 2, 3, ... in this manner, the total rotation angle eventually converges to the desired angle $\theta$ in an order of $2^{-j}$ and a vector V1 rotated by the angle $\theta$ can be calculated.

With a rotation of the angle $\theta_j$ that satisfies Expression (19), since a multiplication of $\tan\theta_j$ simply becomes a bit shift process, the rotation of the angle $\theta_j$ can be executed by an integer-type addition alone if a multiplication of $\cos\theta_j$ is ignored. Although ignoring the multiplication of $\cos\theta_j$ creates an error in a size of the vector equivalent to $\cos\theta_j$, the error can be collectively corrected at the end by multiplication and therefore does not pose a problem. Hereinafter, for the sake of simplicity, a description will be given by omitting the final multiplication for size correction.

Figure 2B:
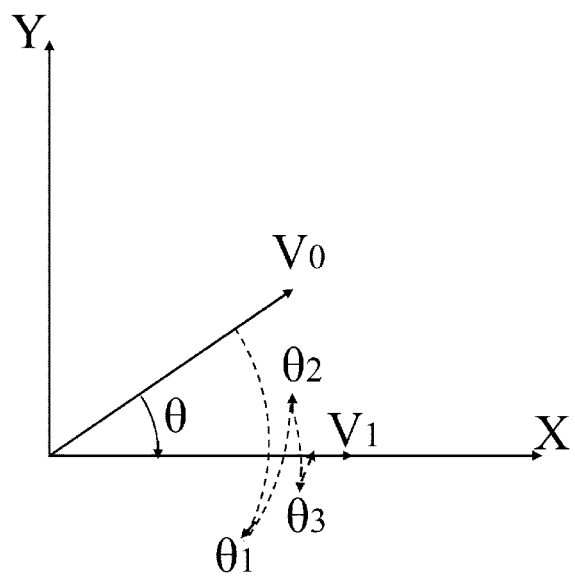
FIG. 2B is an explanatory diagram of a VEC process using a CORDIC algorithm.

The VEC process can be realized by modifying the ROT process. FIG. 2B specifically shows a procedure of the VEC process in which an argument $\theta$ and a size R of a two-dimensional vector V0 are calculated. In the VEC process, convergence of a vector V0 on an x axis is performed by monitoring a sign of a y-direction element of the vector V0, and rotating the vector in a negative direction if the y element is positive and rotating the vector in a positive direction if the y element is negative. Once the vector coincides with the x axis, a size of an x element at that moment represents a size of the vector and a total rotation angle corresponds to the argument $\theta$.

As shown, by using the CORDIC algorithm, both the complicated VEC and ROT processes represented by the Expressions (14) and (17) can basically be calculated by iterations of simple additions and subtractions.

Figure 3:
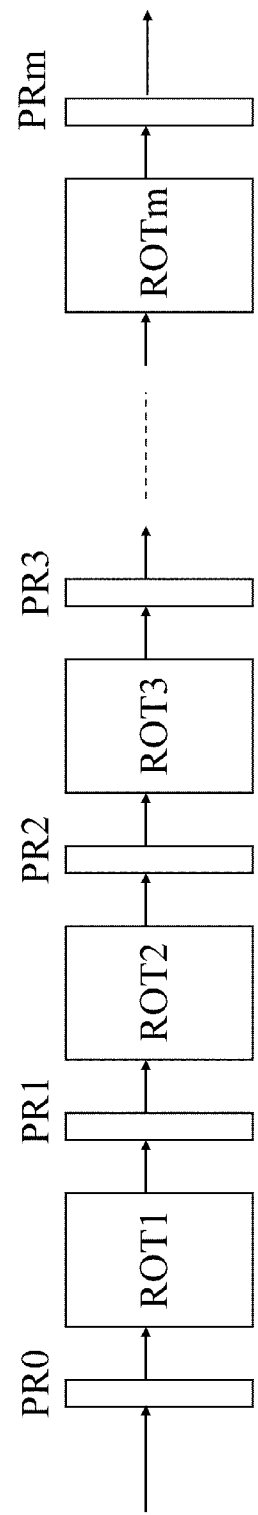
FIG. 3 is a diagram showing an example when a CORDIC algorithm is realized by a pipelined calculation circuit.

FIG. 3 is an example of the CORDIC algorithm implemented by a pipelined circuit system. In FIG. 3, PR0, PR1, ..., PRm denote pipeline registers that constitute an m-stage pipeline circuit, and ROT1, ROT2, ..., ROTm respectively denote rotation circuits that perform rotations of fixed rotation angles $\theta_1, \theta_2, \ldots, \theta_m$ represented in Expression (19). With the pipelined calculation circuit, when an input vector is set to PR0, necessary rotations are sequentially performed according to a predetermined pipeline clock and, after m clocks, a rotation result is outputted from an output register PRm. At this point, if the number of pipeline stages m is equal to or larger than a certain number, an error in the rotation angle is guaranteed to be equal to or smaller than $2^{-m}$ rad. Therefore, the number of pipeline stages m is determined by a required calculation precision.

With a pipelined CORDIC calculation circuit, by setting a different vector to an input register PR0 at each clock, respective rotation results are consecutively outputted after a predetermined number of clocks. Therefore, a pipelined CORDIC calculation circuit characteristically executes a single rotation in an extremely short period of time. However, there is also a problem that the period of time until a result is produced is delayed by a number of clocks corresponding to the number of pipeline stages.

<QR Decomposition Circuit According to the Present Embodiment>

Figure 4:
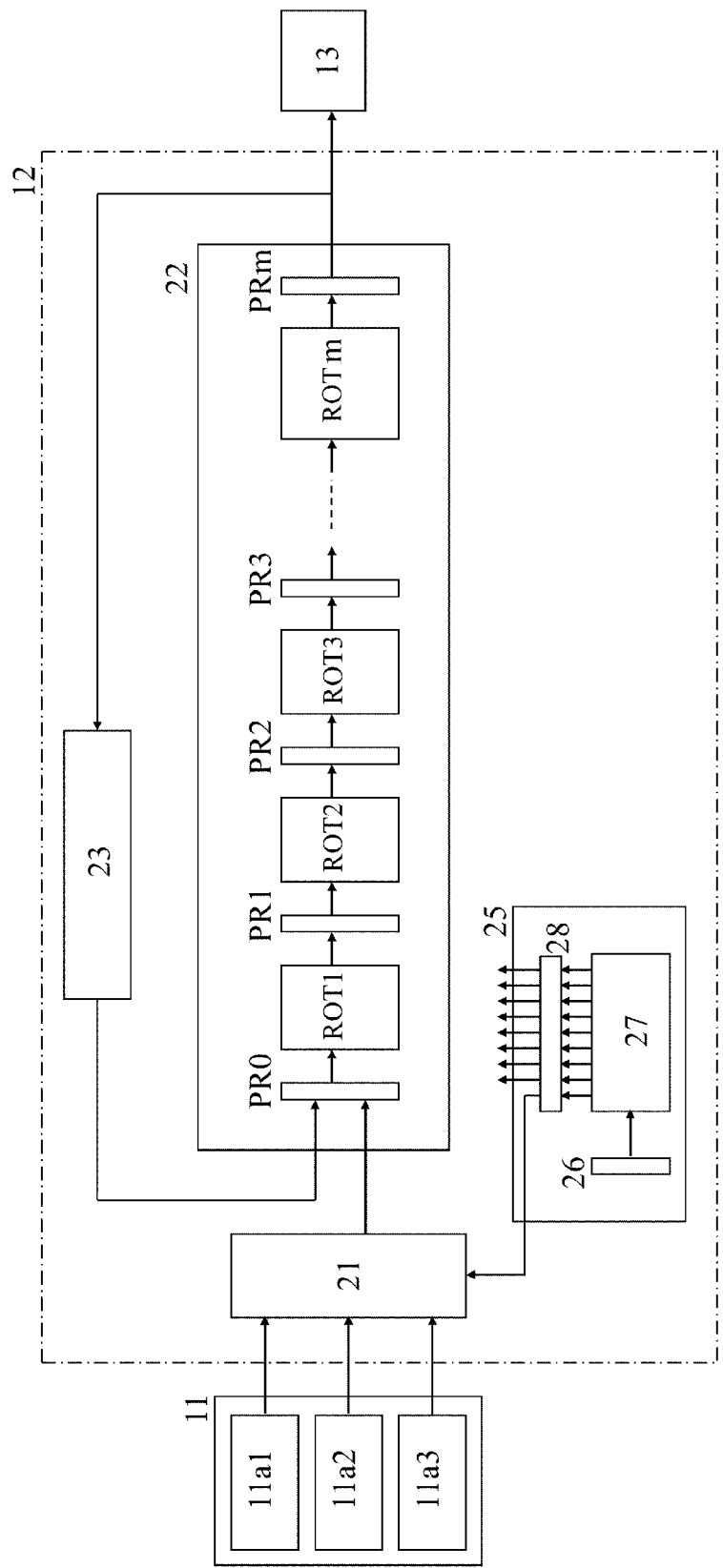
FIG. 4 is a block diagram of a signal processing circuit according to the present embodiment.

FIG. 4 shows an example of the QR decomposition circuit 12 configured in consideration of the properties of the Givens Rotation method and the CORDIC circuit described above. In FIG. 4, reference character 11 denotes a storage circuit that stores a plurality of covariance matrices, 11a1, 11a2, and 11a3 denote matrix data storage areas, 21 denotes a read control circuit that reads a desired element of a stored covariance matrix, 22 denotes the pipelined CORDIC calculation circuit described above, and 23 denotes an intermediate storage circuit capable of temporarily storing an output of the CORDIC calculation circuit 22 and reinputting the output into the CORDIC calculation circuit 22. The CORDIC calculation circuit 22 performs a VEC process or an ROT process by using a desired element of the covariance matrix and intermediate data stored in the intermediate storage circuit 23 as input, and once again stores a result in the intermediate memory 23.

A QR decomposition control circuit 25 uses a program counter 26 to sequentially read microcodes from a program memory 27 to a microcode register 28, and controls a QR decomposition procedure including using read microcodes to (1) read data from the storage circuit 11 and the intermediate storage circuit 23, (2) set input to the CORDIC calculation circuit 22, and (3) write a calculation result into the intermediate storage circuit 23. At this point, if a calculation result is a final calculation result, the calculation result is outputted to a subsequent-stage backward substitution circuit 13 as a QR decomposition result.

As described earlier, since the Givens Rotation method can be executed by iterating VEC processes and ROT processes, QR decomposition can be executed with this configuration by storing a microcode column for QR decomposition process in the program memory 27 in advance.

As shown, QR decomposition can be executed by iteratively driving the CORDIC calculation circuit 22. However, since a QR decomposition process according to the Givens Rotation method often uses a result of one CORDIC calculation in a next calculation, a state where the next calculation must wait for the conclusion of one CORDIC calculation occurs frequently and a calculation speed cannot be sufficiently increased. Therefore, in the present embodiment, by calculating QR decomposition of a plurality of matrices in parallel in an interleaved format, an operating ratio of the pipelined CORDIC calculation circuit 22 can be increased and a calculation time per matrix can be reduced. Parallel calculation in an interleaved format can be readily realized by appropriately setting contents of the program memory 27 of the QR decomposition control circuit 25.

FIG. 5 is a diagram explaining an effect of a parallel calculation according to the present embodiment. Let us assume that a QR decomposition process on a single matrix is made up of two VEC processes Pv1 and Pv2 and three ROT processes Pr1, Pr2, and Pr3, and that (1) a period of 5 clocks is respectively required by calculations of the VEC process and the ROT process, (2) Pr1 and Pr2 uses a calculation result of Pv1 and Pv2 uses a calculation result of Pr2, and (3) Pr3 uses a calculation result of Pv2.

Figure 5A:
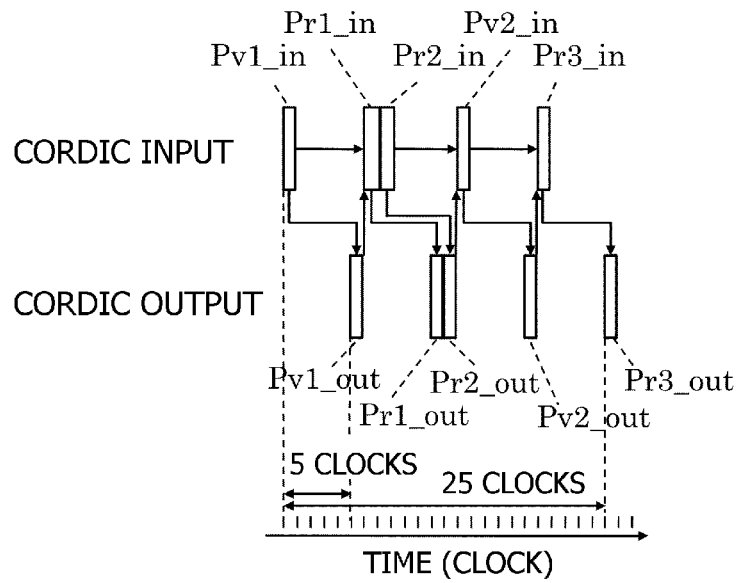
FIG. 5A is a diagram showing a calculation time of QR decomposition of a single matrix.

FIG. 5A specifically shows an input/output sequence to/from the CORDIC calculation circuit 22 for a QR decomposition process in this case. First, when a VEC process Pv1_in is inputted, a result thereof Pv1_out is outputted after 5 clocks, and pending a result thereof, ROT processes Pr1_in and Pr2_in are inputted. When results Pr1_out and Pr2_out of the ROT processes Pr1 and Pr2 are outputted 5 clocks later, pending a result thereof, a VEC process Pv2 is inputted. In this manner, a result Pr3_out of the ROT process Pr3 is finally outputted to conclude the QR decomposition process of a single matrix. A calculation time in this case is approximately 25 clocks as is deducible from FIG. 5A.

Figure 5B:
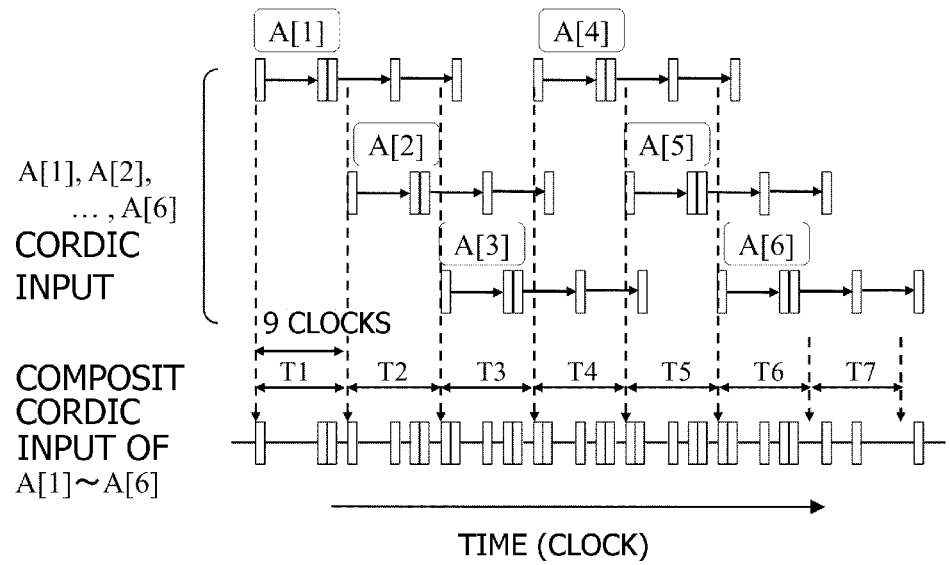
FIG. 5B is an explanatory diagram of a parallel calculation result of QR decomposition according to the present embodiment.

On the other hand, FIG. 5B shows an operating sequence when calculating six input matrices A[1], A[2], . . . , A[6] in parallel in an interleaved format by setting three of the matrices as one unit of a VEC process or an ROT process. In FIG. 5B, parallel calculation is performed by equally dividing a calculation period for one matrix into three time intervals and placing each interval out of phase. While FIG. 5B shows only an input to the CORDIC calculation circuit among the calculation of each matrix, in this example, inputs to the CORDIC calculation circuit 22 are respectively inserted into a vacant time and synthesized as depicted by the synthesis results A[1] to A[6] shown in FIG. 5B. As a result, the operating ratio of the CORDIC calculation circuit 22 is increased and three matrices can now be calculated at a speed of 9 clocks per matrix which is approximately ⅓ compared to a case in which a single matrix is calculated.

FIG. 6 is a diagram showing, for each time interval T1, T2, T3, . . . , an operation sequence of a QR decomposition of matrices A[1], A[2], A[3], . . . consecutively inputted at a constant time period when the N number of matrices calculated in parallel is set to three. Here in FIG. 6, AiPj denotes that an interval process P[j] is performed on the matrix A[i], and the interval process P[j] denotes a calculation of a j-th time interval when a total calculation time of a single matrix is equally divided into N-number of time intervals. In addition, reference characters $11a1$, $11a2$, and $11a3$ on a left-hand side of FIG. 6 denote N-number of matrix storage areas of the covariance matrix storage circuit 11.

Specifically, at time interval T1, an interval process P[1] is performed on a matrix A[1] stored in a matrix storage area $11a$. At time interval T2, an interval process P[2] on the matrix A[1] stored in the matrix storage area $11a$ and the interval process P[1] on a matrix A[2] stored in a matrix storage area $11b$ are calculated in parallel in an interleaved format.

A similar procedure applies to time intervals T3 and thereafter, in which the time intervals T3 and thereafter are concurrently processed by applying respectively different interval processes P[1], P[2], . . . , P[N] to the N-number of matrices. In this manner, for N-number of complex matrices, respectively different process steps are calculated in parallel in an interleaved format at the same point in time. As a result, an advantage is achieved in that parallel calculation can be performed more easily since even if there is a significant variance in the number of calculations among the interval processes, a total number of CORDIC circuit calculations in each time interval becomes uniform with the exception of the first and last intervals.

Moreover, although a clock is conceivable at which a CORDIC circuit input is performed in duplicate in a plurality of interval processes when synthesizing N-number of interval processes P[1], P[2], . . . , P[N] in a same time interval, in such a case, duplicate interval processes are synthesized while being delayed by one clock at a time. Accordingly, although actual widths of the respective time intervals increase slightly, the interval processes can be synthesized and the lengths of the respective time intervals can be uniformized.

When covariance matrices are consecutively inputted at a predetermined period as in a case of an ultrasonic diagnostic apparatus, by conforming the input period to the time intervals described above, a real-time QR decomposition process can be readily performed.

While a calculation function of a CORDIC circuit has been switched to a VEC process or an ROT process in the example described above, it is technically easy to combine and synthesize CORDIC functions into a single CORDIC circuit in order to reduce a total processing time of a QR decomposition. For example, CORDIC circuit configurations may be adopted in which ROT processes with a same angle are concurrently performed on two vectors or a VEC process and an ROT process are concurrently performed. In addition, an ROT process on a result of a single ROT process can be executed by a single circuit or one of the rotations can be performed by a normal multiplication circuit. Even if such modifications for increasing speed or reducing size are made, a significant increase in speed can be achieved by realizing a CORDIC algorithm with a pipeline circuit system and calculating a plurality of matrices in parallel in an interleaved manner, and thus such modifications are included in the present invention.

According to a simulation evaluation, by calculating eight matrices in parallel with a single QR decomposition circuit, an operating ratio of a CORDIC pipeline circuit can be improved by a factor of approximately seven. As a result, with the QR decomposition circuit 12 (FIG. 4) according to the present embodiment, a small-size circuit capable of completing QR decomposition of a 6×6 complex circuit within 120 clocks can be realized. Assuming that a rotation drive clock is 200 MHz, a calculation time per matrix is 600 ns. Considering the fact that calculation time is proportional to a cube of matrix size, the calculation time is approximately 40 times faster than the known example described in NPL1 in which a 4×4 complex matrix is calculated in 8.1 μs. By driving three QR decomposition circuit according to the present embodiment in parallel, a calculation time of 200 ns per column is achieved and enables calculations at a 5 MHz period which is necessary for the ultrasonic diagnostic apparatus described earlier. Since the CORDIC calculation circuit that is central to the QR decomposition circuit is a relatively small circuit mainly constituted by an integer-type addition/subtraction circuit, implementation inside an FPGA that is a simple LSI can be readily achieved even with a configuration having three or more parallel circuits.

As described above, according to the present invention, a high-speed QR decomposition process that is necessary for adaptive signal processing can be realized with a small-size low-cost circuit. Adaptive signal processing can now be more easily applied to an ultrasonic diagnostic apparatus that particularly requires high-speed calculations, and a significant effect can be achieved in realizing higher speeds with the ultrasonic diagnostic apparatus.

As described earlier, many methods such as the Minimum Mean Square Error method and the Maximum SNR method are known as adaptive signal processing techniques in addition to the CMP method described in the example. Many of these methods include a calculation in which an inverse matrix of the covariance matrix A is multiplied by a known vector y and which is expressed as $$A^{-1} y \qquad (20),$$

and require the QR decomposition unit described in the example to execute this calculation. Therefore, even when a method other than the CMP method is adopted, adaptive signal processing can be performed at high speed by using the QR decomposition circuit described above.

In addition, apparatuses other than an ultrasonic diagnostic apparatus such as apparatuses for wireless communication and wireless LANs also requires implementing a similar calculation circuit for the application of adaptive signal processing, and it is needless to say that the signal processing circuit according to the present invention is effective in reducing size and increasing speed of such apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-7571, filed on Jan. 18, 2011, which is hereby incorporated by reference herein in its entirety.

The invention claimed is:

1. A signal processing circuit that respectively transforms complex covariance matrices, which are consecutively inputted at a predetermined period, into upper triangular matrices, the signal processing circuit comprising:
a storage unit that stores at least N-number of complex covariance matrices;
a reading unit that reads matrix elements of the stored complex covariance matrices;
a CORDIC calculation circuit that implements a CORDIC algorithm by a pipelined circuit system; and
a QR decomposition unit that controls the reading unit and the CORDIC calculation circuit to calculate an upper triangular matrix by iteratively using the CORDIC calculation circuit on a single complex covariance matrix and that calculates in parallel a transformation of N-number of complex covariance matrices into upper triangular matrices in an interleaved format,
where the QR decomposition unit divides a calculation process, from inputting a single complex covariance matrix to outputting an upper triangular matrix, into N-number of process steps, and calculates respectively different process steps of the N-number of complex covariance matrices in parallel in an interleaved format.

2. The signal processing circuit according to claim 1, wherein
the QR decomposition unit comprises:
a program memory storing microcodes for controlling the reading unit and the CORDIC calculation circuit; and
a microcode register that stores microcodes read according to a program counter, and
the QR decomposition unit controls the reading unit and the CORDIC calculation circuit according to the microcodes read onto the microcode register.

3. The signal processing circuit according to claim 1, wherein
the CORDIC calculation circuit comprises a pipelined calculation circuit that executes one of or both of a vectoring process and a rotation process.

4. An ultrasonic diagnostic apparatus comprising:
a plurality of ultrasonic receiving elements that receive ultrasonic waves emitted from a subject and convert the ultrasonic waves into received signals;
a time-delay circuit that uniformizes phases of a plurality of received signals acquired from the plurality of ultrasonic receiving elements; and
an adaptive signal processing unit that applies adaptive signal processing to phase-uniformized received signals acquired from the time-delay circuit, wherein
the adaptive signal processing unit comprises:
a complexification circuit that respectively complexifies the phase-uniformized received signals and acquires a plurality of complex signals;
a covariance matrix calculation circuit that calculates complex covariance matrices of the plurality of complex signals; and
the signal processing circuit that respectively transforms complex covariance matrices, which are consecutively inputted at a predetermined period, into upper triangular matrices, the signal processing circuit comprising:
a storage unit that stores at least N-number of complex covariance matrices;
a reading unit that reads matrix elements of the stored complex covariance matrices;
a CORDIC calculation circuit that implements a CORDIC algorithm by a pipelined circuit system; and a QR decomposition unit that controls the reading unit and the CORDIC calculation circuit to calculate an upper triangular matrix by iteratively using the CORDIC calculation circuit on a single complex covariance matrix and that calculates in parallel a transformation of N-number of complex covariance matrices into upper triangular matrices in an interleaved format.

5. The ultrasonic diagnostic apparatus according to claim 4, wherein the QR decomposition unit divides a calculation process, from inputting a single complex covariance matrix to outputting an upper triangular matrix, into N-number of process steps, and calculates respectively different process steps of the N-number of complex covariance matrices in parallel in an interleaved format.

6. The ultrasonic diagnostic apparatus according to claim 4, wherein the QR decomposition unit comprises:
 a program memory storing microcodes for controlling the reading unit and the CORDIC calculation circuit; and
 a microcode register that stores microcodes read according to a program counter, and
 the QR decomposition unit controls the reading unit and the CORDIC calculation circuit according to the microcodes read onto the microcode register.

7. The ultrasonic diagnostic apparatus according to claim 4, wherein the CORDIC calculation circuit comprises a pipelined calculation circuit that executes one of or both of a vectoring process and a rotation process.

8. The ultrasonic diagnostic apparatus according to claim 4, wherein the adaptive signal processing is CMP (Constrained Minimization of Power), MMSE (Minimum Mean Square Error), or MSN (Maximum Signal-to-Noise).

9. The signal processing circuit according to claim 1, wherein the adaptive signal processing is CMP (Constrained Minimization of Power), MMSE (Minimum Mean Square Error), or MSN (Maximum Signal-to-Noise).

* * * * *